A. L. SARGEANT.
NUT LOCK.
APPLICATION FILED MAY 21, 1910.
990,065.
Patented Apr. 18, 1911.
Fig. 1.
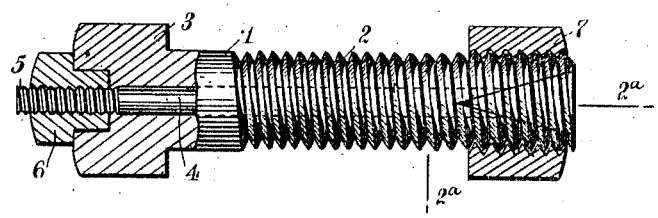
Fig. 2.ᵃ
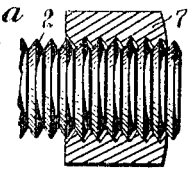
Fig. 2.
 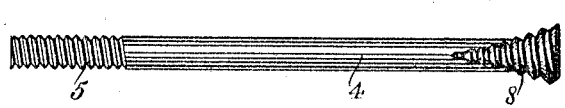
Fig. 3.
Fig. 4.
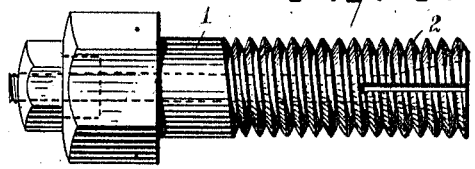
Fig. 5.
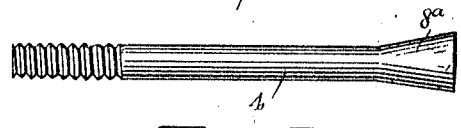
Fig. 7.
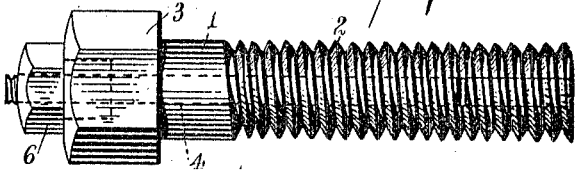
Fig. 6.
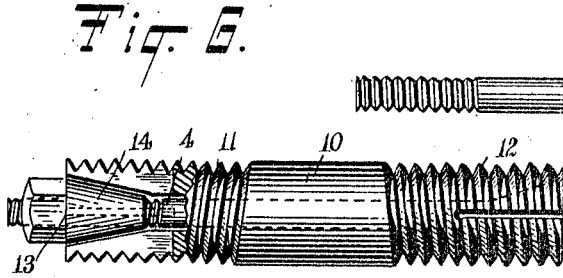
Fig. 8.
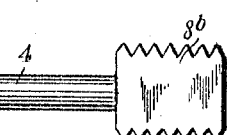
Fig. 9.
WITNESSES:
George Bambay.
INVENTOR
Arthur L. Sargeant
BY
ATTORNEYS

UNITED STATES PATENT OFFICE.

ARTHUR L. SARGEANT, OF ATTICA, INDIANA.

NUT-LOCK.

990,065.  Specification of Letters Patent.  Patented Apr. 18, 1911.

Application filed May 21, 1910. Serial No. 562,728.

*To all whom it may concern:*

Be it known that I, ARTHUR L. SARGEANT, a citizen of the United States, and a resident of Attica, in the county of Fountain and State of Indiana, have invented a new and Improved Nut-Lock, of which the following is a full, clear, and exact description.

This invention relates to a new and improved nut lock.

An object of this invention is to provide a device which will be simple in construction, inexpensive to manufacture, strong, durable and readily adjusted.

A further object of this invention is to provide a bolt in which the nut is locked thereto by a wedging action of the body of the bolt and by an offsetting of a portion of the thread of the bolt.

These and further objects, together with the construction and combination of parts, will be more particularly set forth hereinafter and pointed out in the claims.

Reference is to be had to the accompanying drawings forming a part of this specification, in which similar characters of reference indicate corresponding parts in all the figures, in which—

Figure 1 is a view, partly in section, showing one form of my device; Fig. 2 is a detached view of the spindle used in the form illustrated in Fig. 1; Fig. 2$^a$ is a section on the line 2$^a$—2$^a$ of Fig. 1; Fig. 3 is an end view of the bolt, of the form illustrated in Fig. 1, with the spindle removed therefrom; Fig. 4 is a view of another form of my device; Fig. 5 is a detached view of the spindle used in the form illustrated in Fig. 4; Fig. 6 is an end view of the bolt, of the form illustrated in Fig. 4, with the spindle removed; Fig. 7 is a view of still another form of my device; Fig. 8 is a detached view of the spindle used in the form illustrated in Fig. 7; and Fig. 9 is a view, partly in section, of still another form of my device, similar to the form illustrated in Fig. 4.

Referring more particularly to the separate parts of the device, and especially to Figs. 1 to 3, 1 indicates the body portion of the bolt which is screw-threaded for a portion of its length, as at 2, and may be provided with a head 3 at one end. This bolt is preferably formed with a longitudinally-extending central opening through which is adapted to extend a spindle 4, more clearly illustrated in Fig. 2.

The spindle 4 is provided at one end with a screw-threaded portion 5 which is adapted to be engaged by an auxiliary nut 6 which extends for a portion of its length into a cavity formed in the head 3 and is provided with an enlargement, so as to engage the face of the head 3 and limit the relative movement of the spindle 4 and the nut 6. The threaded portion 2 of the bolt 1 is engaged by a main nut 7 which secures the bolt to the work through which it is inserted.

For the purpose of locking the nut 7 to the bolt 1, the spindle 4 is provided with a wedge portion 8 which extends in the manner of wings to each side of the body of the spindle and is adapted to engage in a corresponding wedge opening in the body of the bolt. It will thus be seen by screwing on the auxiliary nut 6 that the wedge on the spindle will be drawn into the wedge cavity, thereby spreading the threaded portion of the bolt apart, causing it to bind on the thread in the nut 7, as illustrated in Fig. 2$^a$.

In order to further insure the positive locking of the nut 7 on the screw-threaded portion of the bolt 1, the wedge portion 8 is provided with threads which normally extend in contra-juxtaposition to the threads 2 on the body portion, so that the nut 7 can be readily screwed onto the bolt. When the wedge portion 8, however, is drawn inwardly into the wedge cavity, the threads thereon will be automatically offset from the threads on the body portion, so that they will positively bind on the internally-threaded portion of the nut 7, forming a sure lock.

In the form illustrated in Figs. 4, 5 and 6, the wedge portion, which is indicated at 8$^a$, is conical in shape and does not extend to the full diameter of the body portion, and it is not provided with threads. The body portion, further, in place of having the wedge opening at one end, is provided with a plurality of slots 9 which divide the body portion of the bolt into sectors which are adapted to be forced outwardly by the inward movement of the wedge portion 8$^a$ of the spindle, so as to jam the threaded portion of the bolt into engagement with the threaded portion of the nut and securely lock them together. The remaining portions of the bolt are similar to those of the form illustrated in Figs. 1 to 3, and are indicated by the same reference characters.

The form illustrated in Figs. 7 and 8 differs from the form illustrated in Figs. 1 to 3, by omitting the wedge action and depending entirely on the offsetting of the screw-thread on the enlarged portion $8^h$ of the spindle. In this case, the enlarged portion $8^b$ is provided with parallel sides which engage rectangular slots on opposite sides of the body portion of the bolt. It will be seen here also that when the spindle is drawn inwardly, the threads on the enlarged portion $8^b$ will be offset relative to the threads on the bolt and will jam on the internally threaded portion of the nut, thereby locking the nut to the bolt. The remaining portions of the bolt are similar to the first two forms described and are indicated by the same reference characters.

In the form illustrated in Fig. 9 a bolt 10 with a double threaded body portion having threads 11 and 12 formed on opposite ends thereof, is shown. In this case the action is similar to that of the form illustrated in Figs. 4, 5 and 6, and the spindle is the same as the spindle illustrated in Fig. 5. In this case, however, the auxiliary nut, which is indicated at 13, is provided with a conical boss 14 which is adapted to engage in the conical opening in the body portion, so that when the auxiliary nut 13 is screwed onto the spindle, both ends of the bolt 10 will be subjected to the wedging action, so that both of the screw-threaded portions 11 and 12 will be thrust into jamming action with the internally-threaded portion of the nuts thereon, and both of the nuts will be securely locked to the body portion of the bolt. In this case, the spindle is exactly similar to the spindle illustrated in Fig. 5, and is indicated by the same reference numeral.

The operations of the various forms of the device will be readily understood from the above description.

Having thus described my invention, I claim as new and desire to secure by Letters Patent:

1. The combination with a bolt having an externally-threaded body portion and a wedge cavity therein, of a nut adapted to engage said threaded portion, and a spindle slidingly connected to said bolt and having a wedge portion engaging said wedge cavity, whereby said threaded portion on said bolt is locked to said nut, said wedge portion having threads thereon adapted to be offset relative to the threads on said body portion, whereby said bolt is locked to said nut.

2. The combination with a bolt having an externally-threaded body portion and having a central longitudinal opening terminating at one end in a cavity, of a spindle mounted in said central opening, an enlargement on said spindle having threads thereon adapted to be offset relative to the threads on said bolt, a nut adapted to engage said threaded portion on said bolt, and means for manipulating said spindle whereby said threads thereon are offset relative to the threads on said bolt, and whereby said nut is locked to said bolt.

3. The combination with a bolt having an externally-threaded body portion, and also having a central longitudinally-extending opening, of an internally-threaded nut adapted to engage said body portion, a spindle slidingly mounted in said central opening, an enlargement on said spindle extending in the form of wings to either side of said spindle, and an auxiliary nut for manipulating said spindle whereby said first-mentioned nut is locked to said bolt by the movement of said enlarged portion.

In testimony whereof, I have signed my name to this specification in the presence of two subscribing witnesses.

ARTHUR L. SARGEANT.

Witnesses:
 JOHN C. HEGLER,
 JOSEPH J. LITTLE.